| United States Patent [19] | [11] | 4,448,794 |
|---|---|---|
| Wissgott et al. | [45] | May 15, 1984 |

[54] COATING OF ARTIFICIALLY COLORED CHERRIES

[75] Inventors: Ulrich Wissgott, La Tour-de-Peilz; Alexis Berberat, Corseaux, both of Switzerland

[73] Assignee: Societe D'Assistance Technique Pour Produits Nestle S.A., Lausanne, Switzerland

[21] Appl. No.: 386,443

[22] Filed: Jun. 9, 1982

[51] Int. Cl.³ .................. A23B 7/16; A23L 1/272
[52] U.S. Cl. ........................... 426/267; 426/270; 426/304; 426/310
[58] Field of Search ............ 426/102, 267, 303, 304, 426/310, 270

[56] References Cited

U.S. PATENT DOCUMENTS 2,517,595  8/1950  Owens et al. ............... 426/102
2,703,286  3/1955  Eppell ........................... 426/304

FOREIGN PATENT DOCUMENTS 48-77736  10/1973  Japan ........................... 426/102
1302275   1/1973   United Kingdom ........ 426/102

Primary Examiner—Michael S. Marcus
Assistant Examiner—Elizabeth J. Curtin
Attorney, Agent, or Firm—Vogt & O'Donnell

[57] ABSTRACT

A process for coating artificially colored real cherries in which they are contacted firstly with an aqueous solution of an edible calcium salt, then with a warm aqueous solution of a low-methoxy pectin and finally with another aqueous solution of an edible calcium salt.

6 Claims, No Drawings

COATING OF ARTIFICIALLY COLORED CHERRIES

The present invention relates to a method of coating artificially coloured cherries to prevent the migration of the colour therefrom.

Some kinds of cherries, e.g., Bigarreaux Napoleon, do not possess the usual cherry red colour and when they are used in such commodities as canned fruits they are usually artificially coloured with erythrosine. However, a problem with such artificially coloured cherries is that the colour tends to migrate out of the cherries and this is particularly unsatisfactory when the cherries are used in admixture with pale coloured fruits such as peaches and pears because the colour migrates out and colours the peaches and pears, which renders the canned fruit mixture undesirable in appearance to the consumer.

In order to try to prevent this migration of the artificial colour from the cherries one method used has been to fix the artificial colour to the cherry by means of metallic fixing agents. Unfortunately, the use of a metallic salt requires a complicated chemical process involving several acid and alkaline washes in hot water to remove any colourant not bound to the cherries. In addition, the colour fixation depends on the cherry quality (ripeness, origin, etc.) and there is still a little colour migration which is especially noticeable during the sterilisation of a fruit cocktail mixture containing cherries together with pale-coloured fruits such as peaches and pears. Another method for preventing migration has been tried which involves coating the cherries with an alginate. However, such a film does not prevent migration of the colourant.

We have now unexpectedly found that a pectin "film" can be used to prevent the migration of colour from artificially coloured real cherries by a process which is not only surprisingly simple but also extremely easy to manipulate. In our process, the cherries are coated with a gel formed by the reaction of an edible calcium salt and a low-methoxy pectin.

Accordingly, the present invention provides a process for coating artificially coloured real cherries characterised in that they are contacted firstly with an aqueous solution of an edible calcium salt, then with a warm aqueous solution of a low-methoxy pectin and finally with another aqueous solution of an edible calcium salt.

The cherries used in the process are those cherries, e.g., Bigarreaux Napoleon, which do not have the normal cherry red colouration and have a very pale natural colour. Advantageously, they are cut into two halves before they are artificially coloured. In order to maintain cherry texture and to avoid cherry disfigurement due to osmotic pressure, the artificially coloured cherries are generally immersed in a sugar solution for some time prior to coating. Thus, the creating pressure acting against the film in the storage syrup is counterbalanced.

The initial contact of the cherries with the edible calcium salt is conveniently carried out at ambient temperature, for example, by soaking them in a bath containing an aqueous solution of the calcium salt. The concentration of the calcium salt in the aqueous solution may be from 2.5% to 30% by weight, preferably from 5% to 25% by weight, and especially from 7.5% to 20% by weight based on the weight of the water. The time of contact of the cherries with the calcium salt may conveniently be from 0.5 to 15 minutes and preferably from 0.75 to 5 minutes.

After contact with the edible calcium salt, the cherries are contacted with the aqueous solution of the low-methoxy pectin, for instance by immersion therein, conveniently at a temperature from 20° C. to 100° C., preferably from 50° to 75° C. and especially from 60° C. to 70° C. The contact with the low-methoxy pectin may be carried out in acid conditions for instance at a pH of from 2.0 to 4.0, preferably from 2.5 to 3.5 and preferably from 2.8 to 3.3. The desired pH is conveniently obtained by adding the appropriate proportion of a food-acceptable acid such as citric acid. The concentration of the low-methoxy pectin in the aqueous solution may be from 1% to 10% by weight, preferably from 2.5% to 7.5% by weight and especially from 4% to 6% by weight based on the weight of the water. The time of contact of the cherries with the low-methoxy pectin may suitably be from 10 seconds to 5 minutes.

The length of time that the cherries are contacted with the pectin solution influences the thickness of the film, thicker films being formed with longer contact times. Since thin films are desirable, the preferred time of contact is from 10 seconds to 1 minute. The time of contact of pectin and calcium ions which is necessary to form a firm film decreases with increasing concentration of the calcium ions in solution and a uniform thin film is generally formed by a rapid reaction. Preferably, the concentration of the calcium ions in solution is from 1.5 to 4 and especially from 2 to 3 times greater than the concentration of the pectin in solution.

Finally, the cherries, which are covered by a layer of liquid pectin, are contacted once more with an aqueous solution of an edible calcium salt, for instance, by allowing them to fall into a bath containing the calcium salt solution. The solution of the calcium salt may conveniently be at ambient temperature. The pectin on the surface of the cherries begins to harden on contact with the calcium salt. The concentration of the calcium salt is suitably the same as that used for the initial contact with the cherries.

The contact of the cherries with a solution containing calcium ions before coating with pectin is essential for good adhesion of the pectin film on the cherry surface. The contact of the cherries with a solution containing calcium ions after coating with pectin ensures a firm gel formation both inside and outside of the pectin.

The edible calcium salt may be a salt of an edible organic acid such as lactic, gluconic, malic, citric or fumaric acid, or a salt of an edible inorganic acid. Preferably, the salt is calcium chloride.

The low-methoxy pectin has a degree of esterification of less than 50%. Any low-methoxy pectin which reacts with calcium may be used and it may conveniently be employed as the powder, suitable powders being sold commercially by Obipektin under the name "Purple Ribbon."

The coating formed is strong, resistant, transparent, edible, insoluble, almost invisible and modifies neither the appearance nor the shape and structure of the cherries. The colouration of these cherries is uniform and independent of the ripeness or origin of the cherries. The coated cherries may be used in canned fruits.

The following Examples further illustrate the present invention:

EXAMPLE 1

Cherry halves artificially coloured with erythrosine were treated in three stages as follows:

(1) They were soaked for 1 minute at ambient temperature in a bath containing an aqueous solution of calcium chloride having a dissolved calcium chloride concentration of 10% by weight;

(2) they were then removed from the bath and immersed for 1 minute in an aqueous solution of a low-methoxy pectin, sold by Obipektin under the name "Purple Ribbon" having a pectin concentration of 5% by weight, at 70° C. with sufficient citric acid to produce a pH of <3.5;

(3) finally the cherries, covered with a layer of liquid pectin were allowed to fall into another bath containing an aqueous solution of calcium chloride having a dissolved calcium chloride concentration of 10% by weight. The pectin began to harden almost immediately on contact with the calcium to form a strong and resistant film.

MIGRATION TEST 12 of the cherry halves coated by the above method were placed together with 100 grams of pears (cut in cubes) in a glass vessel filled with a syrup containing 20% sugar. The vessel was closed and immersed in boiling water for 60 minutes. The coated cherries retained their colour entirely, no migration having occurred either into the syrup or the pears.

EXAMPLE 2

By following a similar procedure to that described in Example 1 but in which, in each bath of calcium chloride solution, the concentration of dissolved calcium chloride was 20% by weight, a strong and resistant skin was quickly formed on the cherries.

The migration test as described in Example 1 was carried out on the coated cherries of this Example and again no migration occurred either into the syrup or the pears.

COMPARATIVE EXAMPLES A, B, C AND D

Cherry halves artificially coloured with erythrosine were treated in the following way.

Comparative Example A—Treated as in stage 1 of Example 1.

Comparative Example B—Treated as in stage 1 and then stage 2 of Example 1.

Comparative Example C—Treated as in stage 2 of Example 1.

Comparative Example D—Treated as in stage 2 and then stage 3 of Example 1.

The migration test described in Example 1 was carried out on the treated cherries of these Comparative Examples and both the syrup and pears were coloured red in each case, showing that migration had occurred.

COMPARATIVE EXAMPLE E

By following a similar procedure to that described in Example 1 but in which the concentration of pectin in the aqueous solution was 1% by weight, the film formed was fragile, and considerable migration occurred when the migration test described in Example 1 was carried out.

COMPARATIVE EXAMPLE F

By following a similar procedure to that described in Example 1 but using, instead of the low-methoxy pectin solution, an aqueous solution of sodium alginate sold by Fluka AG, the film formed did not prevent the migration of colour when the migration test described in Example 1 was carried out.

We claim:

1. A process for coating artificially coloured real cherries to prevent the migration of the colour therefrom which comprises contacting said cherries with (i) an aqueous solution of an edible calcium salt, then (ii) with a warm aqueous solution consisting essentially of a low-methoxy pectin having a concentration of from 2.5 to 10% by weight based on the weight of water, and then finally (iii) again with an aqueous solution of an edible calcium salt.

2. A process according to claim 1, wherein the concentration of the calcium salt is from 5% to 25% by weight based on the weight of the water.

3. A process according to claim 1, wherein the cherries are contacted with the aqueous solution of the low-methoxy pectin at a temperature from 50° C. to 75° C.

4. A process according to claim 1, wherein the aqueous solution of the low-methoxy pectin has a pH from 2.5 to 3.5.

5. A process according to claim 1, wherein the concentration of the low-methoxy pectin in the aqueous solution is from 2.5% to 7.5% by weight based on the weight of the water.

6. A process according to claim 1, wherein the edible calcium salt is calcium chloride.

* * * * *